(12) United States Patent
Schenk et al.

(10) Patent No.: US 11,485,669 B2
(45) Date of Patent: Nov. 1, 2022

(54) QUARTZ GLASS COMPONENT OF HIGH THERMAL STABILITY, SEMIFINISHED PRODUCT THEREFOR, AND METHOD FOR PRODUCING THE SAME

(71) Applicant: Heraeus Quarzglas GmbH & Co. KG, Hanau (DE)

(72) Inventors: Christian Schenk, Ingelheim (DE); Nadine Tscholitsch, Hanau (DE); Thomas Baier, Hanau (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 941 days.

(21) Appl. No.: 16/030,179

(22) Filed: Jul. 9, 2018

(65) Prior Publication Data
US 2019/0010073 A1 Jan. 10, 2019

(30) Foreign Application Priority Data
Jul. 10, 2017 (EP) ..................................... 17180502

(51) Int. Cl.
C03B 32/02 (2006.01)
C03B 20/00 (2006.01)
C03B 19/06 (2006.01)
C03C 17/00 (2006.01)

(52) U.S. Cl.
CPC ............ *C03B 20/00* (2013.01); *C03B 19/066* (2013.01); *C03B 32/02* (2013.01); *C03C 17/00* (2013.01); *C03C 17/007* (2013.01); *C03C 17/008* (2013.01); *C03B 2201/50* (2013.01); *C03C 2217/425* (2013.01); *C03C 2217/45* (2013.01); *C03C 2217/478* (2013.01)

(58) Field of Classification Search
CPC ....................................................... C03B 32/02
See application file for complete search history.

(56) References Cited

U.S. PATENT DOCUMENTS

| | | | |
|---|---|---|---|
| 3,927,697 A | 12/1975 | Baumler et al. | |
| 4,102,666 A * | 7/1978 | Baumler | C03B 23/207 65/111 |
| 4,935,387 A * | 6/1990 | Beall | C04B 35/553 501/3 |

(Continued)

FOREIGN PATENT DOCUMENTS

| | | |
|---|---|---|
| CN | 1417387 | 5/2003 |
| CN | 1522230 | 8/2004 |

(Continued)

*Primary Examiner* — Cynthia Szewczyk
(74) *Attorney, Agent, or Firm* — Dicke, Billig & Czaja, PLLC

(57) ABSTRACT

In a known method for producing a quartz glass component, a crystal formation layer containing a crystallization promoter is produced on a coating surface of a base body of quartz glass. Starting therefrom, to provide a method for producing a quartz glass component of improved thermal strength and long-term stability which displays a comparatively small deformation particularly also in the case of rapid heating-up processes, it is suggested according to one aspect that a porous crystal formation layer containing amorphous $SiO_2$ particles is produced with a mean thickness in the range of 0.1 to 5 mm, and that a substance which contains cesium and/or rubidium is used as the crystallization promoter.

11 Claims, 4 Drawing Sheets

(56) References Cited

U.S. PATENT DOCUMENTS

| | | |
|---|---|---|
| 2002/0139143 A1 | 10/2002 | Korus et al. |
| 2003/0094131 A1 | 5/2003 | Tsujimoto et al. |
| 2003/0211335 A1* | 11/2003 | McNulty ............... C30B 35/002 |
| | | 428/432 |
| 2005/0178319 A1 | 8/2005 | Korus et al. |
| 2008/0075949 A1 | 3/2008 | Kirst et al. |
| 2008/0289568 A1* | 11/2008 | Kanda .................... C30B 15/10 |
| | | 65/17.3 |

FOREIGN PATENT DOCUMENTS

| | | |
|---|---|---|
| CN | 1662680 | 8/2005 |
| CN | 101023040 | 8/2007 |
| CN | 101316953 | 12/2008 |
| EP | 0753605 | 1/1997 |
| EP | 1956119 | 8/2008 |
| EP | 2460913 | 6/2012 |
| GB | 1377804 | 12/1974 |
| JP | 63-11533 | 1/1988 |
| WO | 03095384 | 11/2003 |

* cited by examiner

QUARTZ GLASS COMPONENT OF HIGH THERMAL STABILITY, SEMIFINISHED PRODUCT THEREFOR, AND METHOD FOR PRODUCING THE SAME

CROSS-REFERENCE TO RELATED APPLICATION

This Utility Patent Application claims priority to Application No. EP 17 180 502.1, filed on Jul. 10, 2017, which is incorporated herein by reference.

BACKGROUND

One embodiment refers to a quartz glass component of high thermal stability which on a coating surface of a base body of quartz glass includes a crystalline stabilization layer which contains $SiO_2$ and a dopant.

One embodiment refers to a semifinished product for producing a quartz glass component which on a coating surface of a base body of quartz glass includes a crystal formation layer which contains a crystallization promoter.

Furthermore, one embodiment refers to a method for producing a quartz glass component of high thermal stability, wherein a crystal formation layer containing a crystallization promoter is produced on a coating surface of a base body of quartz glass.

Quartz glass components are often used for manufacturing processes that require high purity. The temperature stability of quartz glass is here a limiting factor. As the lower softening point for quartz glass, temperature values around 1150° C. are given in the literature. However, the required process temperatures are often above this temperature, so that plastic deformations of the quartz glass components can occur.

It has therefore been proposed to increase the thermal stability of a quartz glass component by providing it with a surface layer of cristobalite. The melting point of cristobalite is around 1720° C. In the following, such a partially or completely crystalline surface layer is also referred to as a "stabilization layer".

However, a structure transformation at a temperature of around 250° C., accompanied by a displacive volume change, which is also known as a "cristobalite jump," can lead to the destruction of the stabilization layer and the component. Therefore, it is hardly possible to cool down the stabilization layer once it has completely formed at elevated temperature, so that it is usually only formed during or immediately before the intended use of the component. In order to promote the formation of the stabilization layer during use, the component has a coating that contains one or more such substances acting as a crystallization promoter. This coating is referred to here as the "crystal formation layer."

Semifinished products which are to be thermally stabilized and consist of electrically fused quartz glass with crystal formation layer are commercially available under the name "HSQ400" (trade name of Heraeus Quarzglas GmbH & Co. KG). A thin $Al_2O_3$ layer is here applied to the coating surface. At a high concentration $Al_2O_3$ acts as a crystallization promoter, so that a layer of crystalline $SiO_2$ phase, particularly of cristobalite, is formed when the component is heated up to a temperature of at least 1280° C. The crystalline layer becomes thicker in the course of the further annealing process, growing into the coating surface, so that the desired thermal stabilization is achieved owing to the softening temperature of cristobalite which is higher by comparison with quartz glass.

U.S. Pat. No. 3,927,697 A suggests that for the thermal stabilization of a quartz-glass diffusion tube a stabilization layer should be produced by applying a mixture consisting of $SiO_2$ powder and a substance to the outer surface of the tube, the mixture promoting devitrification of quartz glass and thus acting as a crystallization promoter. Cristobalite powder and also oxidic, nitridic and carbidic compounds of boron, aluminum, phosphorus, antimony, zinc, magnesium, calcium or gallium are mentioned as crystallization promoters. In one exemplary procedure, a dispersion (slurry) of water and an $Al_2O_3$-doped quartz glass powder is applied to the outer wall of a hollow cylinder of quartz glass, and the slurry layer is dried. Subsequently, the hollow cylinder is elongated into a quartz glass tube, the outer wall of the tube crystallizing while forming the stabilization layer.

A similar method for the production of a quartz glass component of improved temperature stability is also known from WO 2003/095384 A1. The quartz glass component, for instance a crucible or a tube, is provided with a stabilization layer of cristobalite by applying a slurry of $SiO_2$ powder and dopant powder to the component and by heating it to a temperature in the range of 1000-1600° C. The dopant consists for instance of barium, strontium or calcium or of a rare earth metal. The dopant concentration in the coating is at least 0.1 atomic percent.

In the method according to EP 753 605 A1 the thermal stability of a commercially available crucible base body of opaque, bubble-containing quartz glass is increased by treating the vitreous wall thereof with a chemical solution containing a crystallization promoter. When the quartz glass crucible is heated up, for instance during the intended use in the crystal pulling process, the quartz glass crystallizes in the area of the coated crucible wall on the surface while forming crystalline $SiO_2$ phase. Boron, alkaline-earth and phosphorus compounds are mainly named as crystallization promoters, with barium hydroxide being used in one example. The softening temperature of the crystalline $SiO_2$ phase which is higher by comparison with quartz glass contributes to a higher thermal strength of the quartz glass crucible, it counters the entry of contaminants from the crucible wall into the silicon melt, and it can improve the chemical resistance of the surface.

A similar method for the stabilization of a quartz glass element with at least two mutually opposite surfaces is also known from GB 1377804 A. The surfaces have a cristobalite layer formed by surface devitrification of the quartz glass. Aluminum, magnesium, calcium, cesium or mixtures thereof are mentioned as crystallization promoters.

A reaction tube for thermal applications is known from JP S63011533 A, on the inner and/or outer wall of which a layer of beta-cristobalite is produced; fine particles applied to the wall serve as crystallization promoters.

To increase the thermal stability of a quartz glass crucible, EP 2 460 913 A1 proposes to produce non-contiguous crystalline areas with thicknesses in the range of 1 to 900 µm. Aluminum with a concentration in the range of 20 to 60 ppm serves as the crystallization promoter.

The quartz glass components produced according to the known methods exhibit significant deformations, which may lead to a failure of the component, in thermally demanding processes, particularly in fast heating-up processes, despite the formation of a stabilization layer. This can be ascribed to the fact that the evolving crystalline layer is so thin at the beginning that it can only bear a small load and therefore displays a small stabilization effect. Or to the fact that the nucleation and crystallization process sets in comparatively late or progresses slowly, so that an initially low stabilization is here also observed. With a permanent temperature exposure the crystalline layer may also grow into the coating surface of the component, thereby leading to a mechanical weakening.

It is therefore the object of one embodiment to provide a quartz glass component of improved thermal strength and long-term stability which displays a comparatively small deformation particularly also in fast heating-up processes.

It is the object of one embodiment to indicate a semifinished product and a method for the reproducible production of such a quartz glass component.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is illustrated by way of illustration specific embodiments in which one embodiments may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present embodiments. The following detailed description, therefore, is not to be taken in a limiting sense, and the scope of the present embodiments are defined by the appended claims.

It is to be understood that the features of the various exemplary embodiments described herein may be combined with each other, unless specifically noted otherwise.

DESCRIPTION

As for the method, one object starting from a method of the above-mentioned type is achieved according to one embodiment in that a porous crystal formation layer containing amorphous $SiO_2$ particles is produced with a mean thickness in the range of 0.1 to 5 mm, and that a substance which contains cesium and/or rubidium is used as the crystallization promoter.

Figure 7:
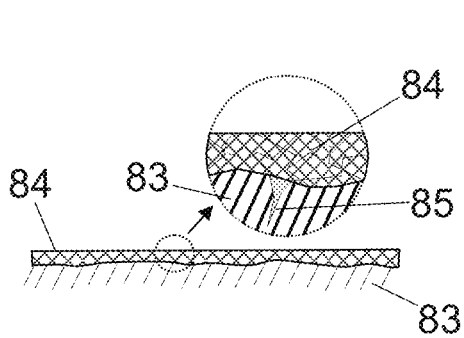
FIG. 7 illustrates a glass surface crystallized by action of a crystallization promoter, in a schematic representation.

The crystal formation layer produced in the method according to one embodiment is intended to crystallize out during heating of the coated component and thus effect its thermal stabilization, as is otherwise also known from the prior art with stabilization layers. In contrast, however, it is characterized by the following features, which in combination produce the desired, improved stabilizing effect:

(1) The crystallization layer contains $SiO_2$ particles in amorphous form. These glassy particles are able to crystallize during heating (the crystallization of glass is also called "devitrification" or "devitrifying"). The crystal formation layer is therefore not only the trigger, but also the object of crystallization and forms at least part of the stabilization layer. This is illustrated schematically in FIG. 8. The cristobalite formation 81 begins on the surfaces of the amorphous $SiO_2$ particles 80, which form the crystallization layer 82. The crystallizing crystal formation layer already stabilizes the base body 83. It is not necessary for the quartz glass of the base body 83 to devitrify. The $SiO_2$ particles 80 present in the crystal formation layer in amorphous form illustrate a great chemical similarity to the glassy $SiO_2$ of the base body 83 even after their devitrification and thus contribute to the adhesion of the crystalline layer to the base body 83. In comparison, crystal formation—as illustrated schematically in FIG. 7—starts without such $SiO_2$-particle-containing crystal formation layer 82 on the surface of the base body 83. Even if this crystallization can be promoted by applying a crystallization promoter, crystal formation occurs at a comparatively higher temperature and/or after a longer heating period and a devitrification starting from the surface develops, which can even mechanically weaken the base body 83, for example by forming near-surface cracks 85, before the crystalline surface layer 84 develops its thermal support effect.

(2) The crystal formation layer is thick enough to absorb the expected mechanical load after its crystallization. Its mean thickness is in the range of 0.1 to 5 mm, in one embodiment in the range of 0.5 to 3 mm.

(3) The crystal formation layer is porous and thereby has a large surface area of more than 5 $m^2/g$. The primary crystallization mechanism in quartz glass is surface devitrification. Porosity and surface therefore promote rapid nucleation and crystallization when the layer is heated up. On the other hand, a porous crystalline layer has a lower strength than a less porous crystalline layer. Therefore, it is desirable to reduce the porosity before devitrification of the layer; this usually occurs automatically by sintering when the layer is heated.

(4) A substance containing at least one of the alkalis cesium or rubidium is present in the crystal formation layer. Several such substances may also be present. The alkali element is usually in the form of a chemical compound. Other components that promote the crystallization of quartz glass may also be present. Cesium or rubidium, however, also cause crystallization of the amorphous $SiO_2$ particles in low concentrations and especially at a surprisingly low temperature below the transformation range of natural quartz glass (that is, below 1200° C.). On the other hand, it has been illustrated that they do not or do not significantly hinder the dense sintering of the porous crystal formation layer and that they do also not penetrate the quartz glass of the base body on a large scale. These effects can be attributed to a low diffusivity of these ions in $SiO_2$ and to their large ion radius compared to other alkali ions (ion radius of rubidium: 148 pm, ion radius of cesium: 169 pm). As a result, the devitrification of the crystal formation layer is substantially limited to the area of the stabilization layer to be formed.

The effects explained above result from the porous layer of amorphous $SiO_2$ particles in combination with a crystallization promoter in the form of the alkalis cesium and/or rubidium. It has been illustrated that already during heating of the crystal formation layer designed according to one embodiment to a temperature of less than 1150° C., cristobalite formation starts and progresses comparatively rapidly and captures the entire crystal formation layer and transforms it into a stabilization layer of crystalline $SiO_2$. Since the devitrification temperature at which the devitrification starts is lower than the softening temperature of quartz glass, the stabilization layer can be formed completely or partially at a temperature below the softening temperature. Or—in the case of heating up to a temperature above 1150° C.—the stabilizing effect starts earlier than the softening of the quartz glass base body due to the forming stabilization layer. This results in high deformation stability.

The crystallization promoter substance is present in the crystal formation layer not in metallic form but in the form of a chemical compound, for example as salt. It has proved advantageous in one embodiment to use a crystallization promoter substance whose melting temperature is below 1150° C., in one embodiment below 1100° C.

The formation of a melting phase facilitates the compaction or densification of the porous crystal formation layer. The mechanisms for densifying and devitrifying the crystal formation layer are each based on temperature-dependent diffusion and other mass transport processes and run independently of each other and partly in competition with each other. The reason is that a densified crystal formation layer can crystallize further, but a completely crystallized layer can hardly be densified further. In one embodiment, where densification starts at a low temperature, especially at a temperature below that where devitrification noticeably sets in, the densification mechanism is promoted compared to the devitrification mechanism, resulting in higher density on the whole and thus higher strength of the vitrified layer. Suitable compounds are chlorides, for example; the melting temperature of rubidium chloride is 715° C. and that of cesium chloride is 646° C.

The devitrification mechanism is influenced by the concentration of the crystallization promoter substance(s); the higher the concentration, the faster the devitrification. On the other hand, the crystallization promoter or part of it can act as an impurity in processes in which the stabilized quartz glass component is used. Therefore the concentration is kept as low as possible. In this respect, it has been illustrated to be beneficial if the proportion of the crystallization promoter substance in the porous crystal formation layer is at least 0.025 mole % and at most 0.5 mole %. The reference value (100%) is the molar oxidic concentration, which is present in the crystal formation layer, of silicon, the dopant and any other substances intentionally added, such as aluminum, present in the respectively highest oxidation stage.

For example, the amorphous $SiO_2$ particles in the crystal formation layer are present as $SiO_2$ soot, as granules from such $SiO_2$ soot, as spherical dense $SiO_2$ particles or as crushed quartz glass grains or from mixtures of these particle variants.

A particle size distribution in the range of 0.1 µm to 100 µm has proven to be particularly favorable, with particle sizes in the range of 1 µm to 60 µm accounting for the largest volume fraction of all particles. The $SiO_2$ particles can illustrate a single- or multi-modal particle size distribution. With multi-modal particle size distribution, a first maximum of the size distribution is in one embodiment in the range of about 0.5 to 5 µm, and a second maximum is in the range of 5 to 50 µm. This facilitates the adjustment of a high packing density in the crystal formation layer. Such particle sizes and particle size distributions can be produced by comminution of quartz glass. In this context, it has proved particularly useful when amorphous $SiO_2$ particles produced by comminution of quartz glass make up the largest volume fraction of the crystal formation layer.

Such particles are obtained by mechanically comminuting coarser quartz glass grains, quartz glass fragments or shaped quartz glass bodies, which is in one embodiment done by grinding. Particles produced by crushing, for example, breaking and grinding of shaped quartz glass bodies may have fractured surfaces. The fragments do not usually have a spherical morphology, but a non-spherical, fragmentary morphology, hereinafter referred to as "splintery morphology". This is conducive to a dense, flat agglomeration and to a mutual interlocking of the $SiO_2$ fragments in a green layer or in a bulk. This flat interlocking at fracture surfaces of the $SiO_2$ particles forms a kind of "house of cards" structure, which enables a higher density of the crystal formation layer and which has a positive effect on its strength and increases the sintering activity. In one embodiment, at least 80% of $SiO_2$ particles, especially in one embodiment at least 90% of $SiO_2$ particles with a particle size of more than 10 µm have a non-spherical, splintery morphology.

The porous crystal formation layer can be produced, for example, by CVD or sol-gel technology. In one embodiment method variant, the creation of the crystal formation layer includes the following method steps:

(a) applying a dispersion containing $SiO_2$ particles in a liquid as a slurry layer to the coating surface, and (b) drying the slurry layer to form a green layer.

The dispersion—also called "slurry"—contains at least some of the $SiO_2$ particles and in one embodiment all $SiO_2$ particles of the crystal formation layer. It is applied to the coating surface of the base body using conventional coating methods, for example by casting, spraying, dipping, flooding, spinning, doctoring or painting.

In one embodiment, the dispersion contains the crystallization promoter or a precursor of the crystallization promoter in dissolved form. This makes it possible to achieve a particularly homogeneous crystallization promoter distribution in the slurry layer. The homogeneous distribution facilitates uniform crystallization and allows the concentration of the crystallization promoter to be kept as low as possible, for example at a fraction in the range of 0.025 to 0.5 mole % (as already explained above).

The slurry layer is dried and a so-called green layer is obtained. The green layer is porous, whereby in one embodiment a green density of at least 1.7 g/cm$^3$ is set for high strength. The green density is substantially determined by the solids content of the dispersion and the shape of the $SiO_2$ particles. For example, the solids content is in the range of 65 to 85% by weight and the $SiO_2$ particles are in one embodiment and predominantly those with the splintery morphology explained above.

The dried, porous green layer can be further processed; for example, it can be impregnated with a solution containing the crystallization promoter or a precursor substance for it. In one embodiment method variant, however, it is intended that the dispersion already contains at least part of the crystallization promoter concentration or a precursor substance thereof. In one embodiment, the dispersion contains the total proportion of crystallization promoter according to its proportion in the crystal formation layer. The crystallization promoter or a precursor substance thereof is in one embodiment present in dissolved form, so that a homogeneous distribution in the dispersion and an even doping of the $SiO_2$ particles in the green layer are guaranteed. When the slurry layer dries, the crystallization promoter is precipitated evenly covering the surfaces of the amorphous $SiO_2$ particles.

The dried green layer is characterized by good adhesion to the base body, which is an important condition for the development of a supporting effect already before sintering. During sintering, too, the adhesion and thus the supporting effect are maintained, so that the base body largely retains its shape during sintering, even if the dopant(s) cesium and/or rubidium are used. Compared to a dopant-free green layer, these dopants do not or only insignificantly impair the adhesive strength.

The green layer containing the crystallization promoter forms a crystal formation layer in the sense of one embodiment, so that the quartz glass component thus conditioned is basically prepared for its intended use. However, the green layer is sensitive and can be rubbed off or damaged, for example, during further handling and transport of the quartz glass component.

In this respect, a certain thermal solidification is advantageous, in which the green layer is thermally densified at a temperature in the range of 670° C. to 1000° C.

However, previous crystallization of the crystal formation layer should be avoided if possible. The porosity of the crystal formation layer is reduced and in one embodiment a density of at least 1.75 g/cm$^3$ is achieved. The densification temperature is therefore chosen to be as low as possible. It can be set particularly low if the green layer contains sintering aids that reduce the sintering temperature. Sintering aid in this sense can also be the crystallization promoter substance or a precursor substance thereof if the densification temperature is above its melting point and below the boiling point. If necessary, a mechanically more stable, densified green layer is obtained by liquid phase formation, which ideally does not illustrate continuous crystallization until then, but at best illustrates crystal nuclei. Only when the quartz glass component is used as intended does complete cristobalite formation with formation of the stabilization layer occur. The mechanism of liquid phase sintering, in which the dopant acts as a low-melting component that promotes the bond of the higher-melting $SiO_2$ grains, starts slightly (about 25° C.) above the melting temperature of the respective dopant. For example, the start temperature calculated in this way for liquid phase sintering is around 670° C. for CsCl and around 740° C. for RbCl.

With regard to the semifinished product for producing a quartz glass component of high thermal stability, the object starting from a semifinished product of the aforementioned type is achieved according to one embodiment in that the crystal formation layer contains amorphous $SiO_2$ particles, that it is porous, that it has a mean thickness in the range of 0.1 to 5 mm and that the crystallization promoter is a substance which contains cesium and/or rubidium.

The semifinished product according to one embodiment is obtained, for example, using the method described above in accordance with one embodiment. It carries a crystal formation layer which is intended to crystallize out during heating and thereby effect thermal stabilization.

The crystal formation layer contains $SiO_2$ particles in amorphous form and in one embodiment with splintery morphology. These glassy particles are able to crystallize during heating, whereby the crystal formation should initially and if possible exclusively take place in the crystal formulation layer.

The crystal formation layer has a mean thickness in the range of 0.1 to 5 mm, in one embodiment in the range of 0.5 to 3 mm, and is thus so thick that it is able to absorb the expected mechanical load on its own after its crystallization. It is porous and therefore has a large surface area (more than 5 m$^2$/g), which promotes rapid nucleation and crystallization when the layer is heated up.

The crystal formation layer contains at least one of the alkalis cesium or rubidium. In one embodiment only the alkalis cesium or rubidium are contained, and in the in one embodiment case only rubidium. The alkali element is usually in the form of a chemical compound. Other components that promote the crystallization of quartz glass may additionally be present. Cesium or rubidium illustrate a low diffusivity in quartz glass compared to other alkali ions. They do not impair or do not significantly impair the dense sintering of the porous crystal formation layer and even in low concentration and particularly at a surprisingly low temperature below the softening temperature of quartz glass (also below 1150°) they effect a crystallization of amorphous $SiO_2$. Due to their low diffusivity in quartz glass, the devitrification is substantially limited to the region of the crystal formation layer.

Already when heating the crystal formation layer, which has been designed according to one embodiment, to a temperature of less than 1150° C., cristobalite formation begins, which progresses comparatively rapidly and captures the entire crystal formation layer and transforms it into a stabilization layer of crystalline $SiO_2$. Since the devitrification temperature at which the devitrification starts is lower than the softening temperature of quartz glass, the stabilization layer can be formed completely or partially at a temperature below the softening temperature. Or—in the case of heating up to a temperature above 1150° C.—the stabilizing effect starts earlier than the softening of the quartz glass base body due to the evolving stabilization layer. In any case, high deformation stability is achieved.

The crystallization promoter substance is present in the crystal formation layer in the form of a chemical compound, for example as a salt. It has proven to be advantageous in one embodiment if the crystallization promoter substance has a melting temperature below 1150° C., in one embodiment below 1100° C.

The formation of a melting phase facilitates the densification of the porous crystal formation layer. In one embodiment that densification begins at a low temperature, especially at a temperature below that where devitrification noticeably sets in, the densification mechanism is promoted in relation to the devitrification mechanism, which results in a higher density and thus a higher strength of the vitrified layer. Suitable compounds are chlorides, for example; the melting temperature of rubidium chloride is 715° C. and that of cesium chloride is 646° C.

The devitrification mechanism is influenced by the concentration of the crystallization promoter; the higher the concentration, the faster the devitrification. On the other hand, the crystallization promoter or part of it can act as an impurity in processes in which the stabilized quartz glass component is used. Therefore, the concentration is kept as low as possible. In this respect, it has been illustrated to be beneficial if the proportion of the crystallization promoter substance in the porous crystal formation layer is at least 0.025 mole % and at most 0.5 mole %. The reference value (100%) is the molar oxidic concentration, which is present in the crystal formation layer, of silicon, the dopant and any other substances intentionally added, such as aluminum, present in the respectively highest oxidation stage.

The amorphous $SiO_2$ particles in the crystal formation layer in one embodiment have splintery morphology. This is produced, for example, by crushing quartz glass. It has proven to be advantageous in one embodiment when amorphous $SiO_2$ particles produced by comminution of quartz glass make up the largest volume fraction of the crystal formation layer.

Particles produced by crushing, especially breaking and grinding of shaped quartz glass bodies have fractured surfaces. The fragments do not usually have a spherical morphology, but a non-spherical, fragmentary, splintery morphology, which is conducive to a dense, flat agglomeration and to a mutual interlocking of the $SiO_2$ fragments in a green layer or in a bulk. This flat interlocking at fracture surfaces of the $SiO_2$ particles forms a kind of "house of cards" structure, which enables a higher density of the crystal formation layer and which has a positive effect on its strength and increases the sintering activity. In one embodiment, at least 80% of the $SiO_2$ particles, in one embodiment at least 90% of $SiO_2$ particles with a particle size of more than 10 µm have a non-spherical, splintery morphology. The porous crystal formation layer in one embodiment has a density of at least 1.7 $g/cm^3$ for high strength.

The composite of base body and crystal formation layer is basically prepared for the intended use of the quartz glass component. However, it can still be thermally solidified before its use, so that the porosity is reduced and a density of at least 1.75 $g/cm^3$ is set.

With regard to the quartz glass component of high thermal stability, the object is achieved according to one embodiment by the fact that it has a crystalline layer containing $SiO_2$ and a dopant selected from the group cesium and rubidium on a coating surface of a base body of quartz glass, the fraction of the dopant in the stabilization layer being in the range between 0.025 and 0.5 mole %.

The stabilization layer in the quartz glass component according to one embodiment is obtained by devitrifying the crystal formation layer in the semifinished product according to one embodiment. Devitrification takes place when the quartz glass component is used as intended or before.

The stabilization layer substantially contains devitrified $SiO_2$ particles and one or more dopants that have contributed to the crystallization of the layer in advance. They are usually present in the stabilization layer in oxidic form. At least one of the dopants contains cesium or rubidium. Even at low concentrations of between 0.025 and 0.5 mole % and at low temperatures, the alkali ions cesium or rubidium cause crystallization of amorphous $SiO_2$. Due to their great ion radius compared to other alkali ions they do not penetrate the quartz glass of the base body to a large extent. As a result, devitrification is substantially limited to the area of the stabilization layer. The quartz glass of the base body is in one embodiment free of crystals. Due to the chemical similarity of the crystalline $SiO_2$ of the stabilization layer and the glassy $SiO_2$ of the base body, the stabilization layer adheres well.

The stabilization layer is thick enough to absorb the expected mechanical load. Its mean thickness is in one embodiment in the range of 0.1 to 5 mm, in one embodiment in the range of 0.5 to 3 mm.

The quartz glass component according to one embodiment illustrates high deformation stability even at temperatures up to 1600° C.

Definitions and Measurement Methods

Individual method steps and terms of the above description as well as measurement methods are defined additionally in the following. The definitions are part of the description of the embodiments. In the event of a conflict in content between any of the following definitions and the rest of the description, what is stated in the description shall prevail.

Crystallization Promoter

A crystallization promoter is a substance that promotes crystallization of amorphous $SiO_2$. A large number of such substances have been described in the literature. According to one embodiment, rubidium and/or cesium is used as crystallization promoter; this does not exclude the use of additional, other crystallization promoter substances.

In the crystallization layer, the crystallization promoter is present in metallic form or as a compound with another component or with several other components, such as oxide, chloride, carbonate and/or hydroxide.

After devitrification of the crystal formation layer, the former crystallization promoter is part of the crystalline $SiO_2$ modification; it is usually present in oxidic form.

Concentration data related to the crystal formation layer are therefore based on the molar oxidic concentration of silicon, the dopant and any other deliberately added substances, each present in its highest oxidation stage (for example, $Rb_2O$). The determination of the amount of a non-oxidic starting substance (for example, RbCl) is based on the ratio of the respective molecular weights of the starting substance in the oxidic and non-oxidic phases.

Slurry

The term "slurry" is used for a dispersion of a liquid and $SiO_2$ solid particles. Water purified by distillation or deionization can be used as the liquid to minimize the content of impurities.

Particle Size and Particle Size Distribution

Particle size and particle size distribution of the finely divided amorphous $SiO_2$ particles are characterized by the $D_{50}$ values. These values are taken from particle size distribution curves illustrating the cumulative volume of $SiO_2$ particles as a function of the particle size. The $D_{50}$ value indicates the particle size which is not reached by 50% of the cumulative volume of the $SiO_2$ particles. The particle size distribution is determined by scattered light and laser diffraction spectroscopy according to ISO 13320.

Splintery $SiO_2$ Reinforcing Bodies and Aspect Ratio

The comminution of a partially densified porous $SiO_2$ shaped body produces fragments of the original shaped body which illustrate fractured surfaces and usually a splintery, non-spherical morphology with an aspect ratio (also referred to as the "structural ratio") of at least 2. The "aspect ratio" is the ratio of the largest structural width of the fractured particle and its thickness. An aspect ratio of at least 2 thereby means that the largest structural width is at least twice greater than its thickness.

Measurement of Porosity, Pore Size, Pore Volume and Specific Surface Area (BET-SSA)

The specific pore volume of a porous material designates the free volume within the material occupied by cavities. Pore volume and porosity are determined by mercury porosimetry according to ISO15901-1 (2005). Mercury is pressed into the pores of the porous material under the effect of external pressure against the counteracting surface tension forces. The force required for this is inversely proportional to the pore size and therefore, in addition to the cumulative total pore volume, the pore size distribution of the sample can also be determined.

The porosimeters used are "ThermoFisher Scientific" PASCAL 140" (low pressure up to 4 bar) and PASCAL 440 (high pressure up to 4000 bar), each calibrated with porous glass spheres with a pore diameter of 75 nm (based on: University of Leipzig, Faculty of Chemistry and Mineralogy, Institute of Technical Chemistry). The "Washburn method" is used to correct the mercury density for the actual temperature. 0.484 N/m is used for the surface tension and 141.1° for the contact angle. The sample size is selected between approx. 30 and 40 mg. Before starting a measurement, the measurement sample is heated at 120° C. for 24 hours. The device automatically evacuates the measurement sample to an absolute pressure of 0.01 kPa.

The specific surface area is measured by way of a sorption measurement according to the method of Brunauer, Emmet and Teller (BET method) on the basis of DIN ISO 9277: 1995. The measuring device is "NOVA-3000 (from Quantachrome), which works according to the SMART method (sorption with adaptive rate dosing). The reference materials used are alumina SARM-13 and SARM-214 from Quantachrome. The saturation vapor pressure of nitrogen (N2 4.0) is determined and the measurement sample is dried at 200° C. for 1 hour under vacuum. After cooling, the weight of the measurement sample is determined and then degassed and evacuated up to an absolute pressure of 200 mbar. In the pressure range in which monolayers and multilayers of absorbed molecules are formed, the specific surface area (BET-SSA) is determined from the multilayer adsorption isotherm (BET isotherm) according to Brunauer, Emmett and Teller.

Particle Size Distribution

The particle size and particle size distribution is determined by laser diffraction on a dispersed sample according to ISO 13320. The measuring device used is a Mastersizer 3000 from Malvern, which is equipped with a He—Ne laser, a blue LED and a wet dispersion unit for measurements at ambient temperature (23° C.). The wet dispersion unit is adjusted to an ultrasonic power of 80% and water is used as the dispersing agent. The D50 values of the particle size distribution are determined using the 21 CFR device software with a form factor of 1. The D50 value indicates the particle size which is not reached by 50% of the cumulative particle volume (median value of the particle size).

Particle sizes of more than 315 µm and corresponding size distributions were determined by sieve analysis using an "Air Jet RHEWUM LPS 200 MC" (RHEWUM GmbH) sieving device.

Measurement of Diffusion Profiles

Concentration profiles were determined on polished cross sections of the coated measurement samples after completion of a specified temperature treatment by inductively coupled plasma mass spectroscopy (ICP-MS). Implementation at the Institute of Geosciences, JGU Mainz; ESI NWR 193 nm excimer laser with a wavelength of 193 nm, coupled with an Agilent 7500ce quadrupole ICP-MS.

Dilatometer Measurements

The thermomechanical analysis of measurement samples is performed using a commercially available L75VS1600 vertical dilatometer from Linseis GmbH.

Deformation Measurements

Method 1: Sagging tests on test rings

Test rings made of quartz glass with an outer diameter of 320 mm, a wall thickness of 5 mm and a height of 30 mm were manufactured and provided with various crystallization promotor coatings. To carry out the sagging tests, several test rings were placed one after the other resting on their outer surface in a furnace and were subjected to a specified temperature treatment. After cooling, the deformation of the test rings was evaluated visually and qualitatively.

Method 2: Deflection tests on test plates

Plates of electrofused quartz glass measuring 50×300×3 mm were manufactured and provided with various crystallization promotor coatings. To carry out the deflection tests, the test plates were placed on ceramic supports with a free distance of 240 mm and subjected to a specified temperature treatment in a furnace. After cooling, the maximum deflection of the plate was determined.

Raman Spectroscopy

The presence of cristobalite phase was identified by Raman spectroscopy. The device used has the designation "LabRam HR 800" (Horiba Group). It is coupled to an Olympus BX41 optical microscope and a Si CCD (Charge-Coupled Device) detector.

The measurement was carried out at room temperature, whereby spectra were recorded at wave numbers between 150 and 1200 cm$^{-1}$. An Ar+ ion laser (514 nm emission) was used for this purpose.

Embodiment

Embodiments will now be explained in more detail with reference to embodiments and a drawing.

Preparation of a $SiO_2$ Slurry Containing a Crystallization Promoter

Amorphous quartz glass granules of natural raw material with grain sizes in the range between 250 µm and 650 µm are mixed into a dispersion liquid (water). The quartz glass granules were first cleaned in a hot chlorination process; care is taken to ensure that the cristobalite content is below 1% by weight.

This mixture is ground in a drum mill lined with quartz glass using grinding balls of quartz glass on a roller block at 23 rpm for a period of 3 days until a homogeneous slurry is formed. During the grinding process, the pH value is reduced to about 4 as a result of the dissolving $SiO_2$.

The $SiO_2$ granule particles obtained after grinding of the quartz glass granules are of a splintery nature and illustrate a particle size distribution characterized by a $D_{50}$ value of about 8 µm and a $D_{90}$ value of about 40 µm. $SiO_2$ nanoparticles with diameters around 40 nm ("pyrogenic silica") are added to the homogeneous slurry with a proportion of 5% by weight (based on the solids content of the dispersion). After further homogenization, a binder-free SiO₂ base slurry is obtained. The solids content of the dispersion is 75% by weight; the SiO₂ content of the amorphous SiO₂ particles is at least 99.99% by weight.

For the preparation of a dispersion doped with a crystallization promoter in the form of RbCl or CsCl, aqueous dopant solutions of RbCl or CsCI (molar ratio 4:1) are produced in parallel in 400 ml ultrapure water. Other alkali compounds such as organic compounds, nitrides or fluorides can be used instead of chlorides.

The dopant solution is added to the homogeneous base slurry in different quantities. After further homogenization, binder-free SiO₂ dispersions are obtained which contain the crystallization promoter in the desired concentration.

The composition of the respective dispersions is illustrated in Table 1:

Preparation of Measurement Samples

To determine the thermal stability by means of deflection tests, test plates of electrofused quartz glass measuring 50×300×3 mm were provided by immersion on all sides with a layer containing these SiO₂-containing dispersions (slurry layer) with a mean thickness of 1 mm and the slurry layer was then dried.

For the production of comparative samples, quartz glass test plates were coated on all sides with a salt solution of crystallization promoters. These coatings contain the crystallization promoter or a precursor substance of the crystallization promoter in high concentration (virtually 100%) but no amorphous SiO₂ particles. In two other comparative samples, the test plate remained uncoated or was sprinkled directly with cristobalite crystal powder.

To determine the thermal stability by means of deformation tests on standing quartz glass rings ("sagging tests"), tube sections (test rings) of quartz glass with an outer diameter of 320 mm, a wall thickness of 5 mm and a height of 30 mm were manufactured and sprayed onto the outer wall of a slurry layer with a thickness of about 1 mm.

For the production of comparative samples, quartz glass test rings were here also coated on all sides with a salt solution of crystallization promoters. These coatings contain the crystallization promoter or a precursor substance of the crystallization promoter in high concentration (virtually 100%) but no amorphous SiO₂ particles. These layers have small thicknesses of approx. 10 μm.

For the measurement of diffusion profiles, round plates of quartz glass with a diameter of 35 mm and a thickness of 6 mm were provided by spraying on one side with a slurry layer with a mean thickness of 1 mm.

The drying of the slurry layer to a porous green layer takes place respectively by the slurry layer resting in air for eight hours. The complete drying takes place with the use of an IR radiator in air during 4 hours. The green density is about 1.75 g/cm³ each.

In one of the measurement samples, the dried green layer is then thermally slightly pre-densified in a sintering furnace at a temperature of around 1000° C.; it then has a density of about 1.85 g/cm³.

Table 1 summarizes the typical production parameters and the measurement results of the samples.

TABLE 1

| No | Crystallization promoter | M (mole %) | Amorphous SiO₂ particles | Layer thickness (mm) | Deflection (mm) |
|---|---|---|---|---|---|
| 1 | RbCl | 0.5 | Yes | 1 mm | <2 |
| 2 | RbCl | 0.1 | Yes | 1 mm | <2 |
| 3 | RbCl | Salt layer | No | 10 μm | ~10 |
| 4 | CsCl | 0.5 | Yes | 1 mm | <2 |
| 5 | CsCl | 0.1 | Yes | 1 mm | <2 |
| 6 | CsCl | Salt layer | No | 10 μm | ~10 |
| 7 | Al₂(SO₄)₃ | 0.5 | Yes | 1 mm | ~10 |
| 8 | Al₂(SO₄)₃ | Salt layer | No | 10 μm | ~10 |
| 9 | NaCl | 0.1 | Yes | 10 mm | <2 |
| 10 | CaCl₂ | 0.1 | Yes | 10 mm | ~7 |
| 11 | MgCl₂ | 0.1 | Yes | 1 mm | ~8 |
| 12 | LaCl₃ | 0.1 | Yes | 1 mm | ~9 |
| 13 | ZrCl₄ | 0.1 | Yes | 1 mm | ~10 |
| 14 | Cristobalite | 0.1 | Yes | 1 mm | ~10 |
| 15 | SiO₂ layer without doping | 0.1 | Yes | 1 mm | ~10 |
| 16 | Uncoated quartz glass plate | n/a | No | n/a | ~10 |

M: Mole fraction of the crystallization promoter in the dispersion, based on the solids content, the specification "salt layer" refers to a thin surface coating having a thickness of about 10 μm and consisting of a soluble salt of the crystallization promoter.

Results of Deformation Measurements

Figure 3:
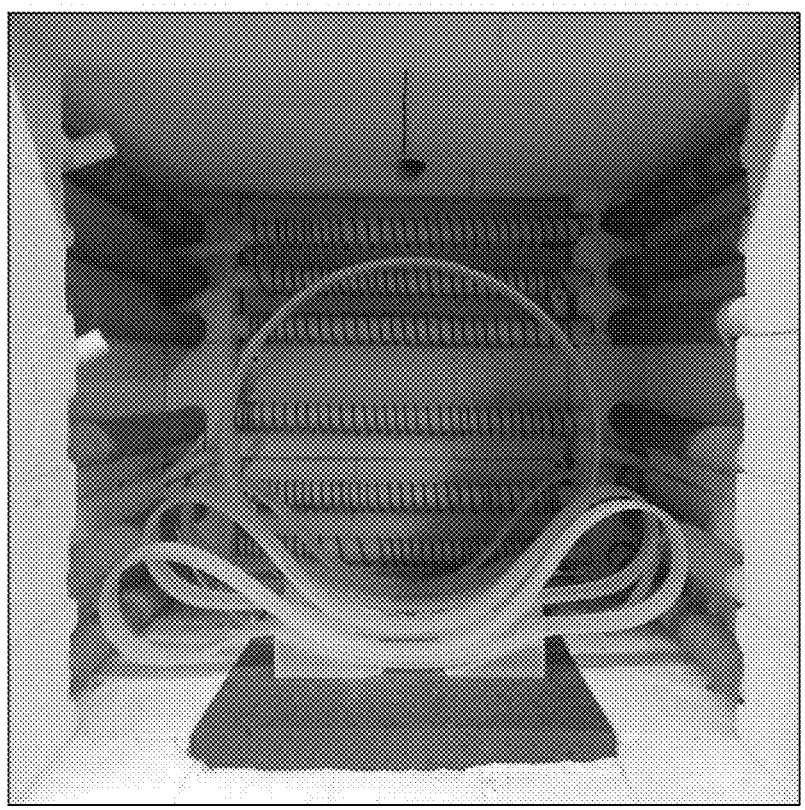
FIG. 3 illustrates a photo of several tube sections after conduction of a so-called "sagging test" in a furnace.

The photo of FIG. 3 illustrates the result of standard deformation measurements (sagging tests) on four quartz glass test rings coated with a crystallization promoter according to the above samples 2, 3, 7 and 8 from Table 1. For this test the furnace is heated to a temperature of 1365° C. and maintained at this temperature for 18 hours.

It turns out that only the test ring of sample 2 withstands this load. In an experiment, it was heated by way of trial to a temperature of 1600° C. and illustrated no significant deformation. For all other samples, the maximum deformation temperature is below 1365° C.

In another series of deformation measurements, the deflection of the above-mentioned measurement samples was determined in the form of coated plates of electrofused quartz glass. The coated quartz glass plates were placed with their ends on supports and subjected to a specified temperature treatment in a furnace. After cooling, the maximum deflection of the plate was determined. The last column of Table 1 illustrates the deflections determined for a temperature treatment with the following temperature treatment: Heating of the furnace from 200° C. to 1250° C. within 3 hours, maintaining this temperature for 6 hours, then free cooling of the furnace.

Accordingly, a low deflection is achieved if the crystal formation layer fulfills two conditions. First, it contains a crystallization promoter in the form of alkalis Rb, Cs or Na, and second, it contains amorphous SiO₂ particles. All other measurement samples illustrate insufficient thermal stabilization, which is illustrated by a deflection of about 10 mm. This also applies to the crystal formation layer produced using cristobalite according to sample 14. The NaCl-containing crystal formation layer of sample 9 is a comparative example. Although it illustrates sufficient thermal stabilization, it has other disadvantages, especially with regard to the contamination effect of sodium.

Results of Dilatometer Measurements

Figure 1:
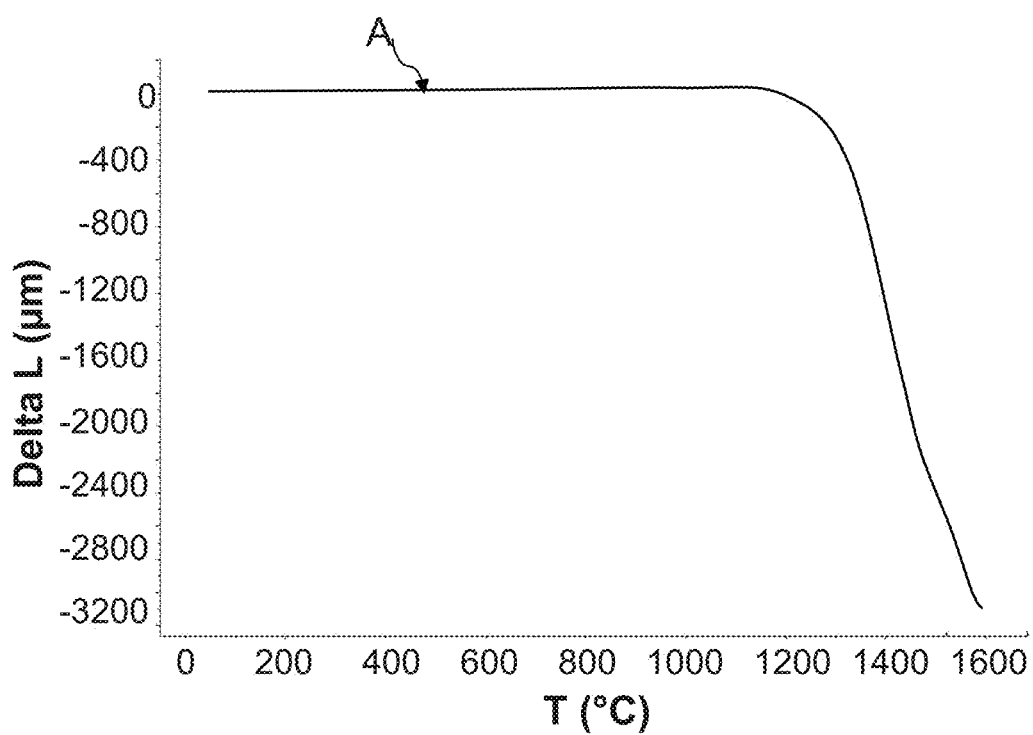
FIG. 1 illustrates the result of a differential thermal analysis in a crystal formation layer containing rubidium chloride as the crystallization promoter.
Figure 2:
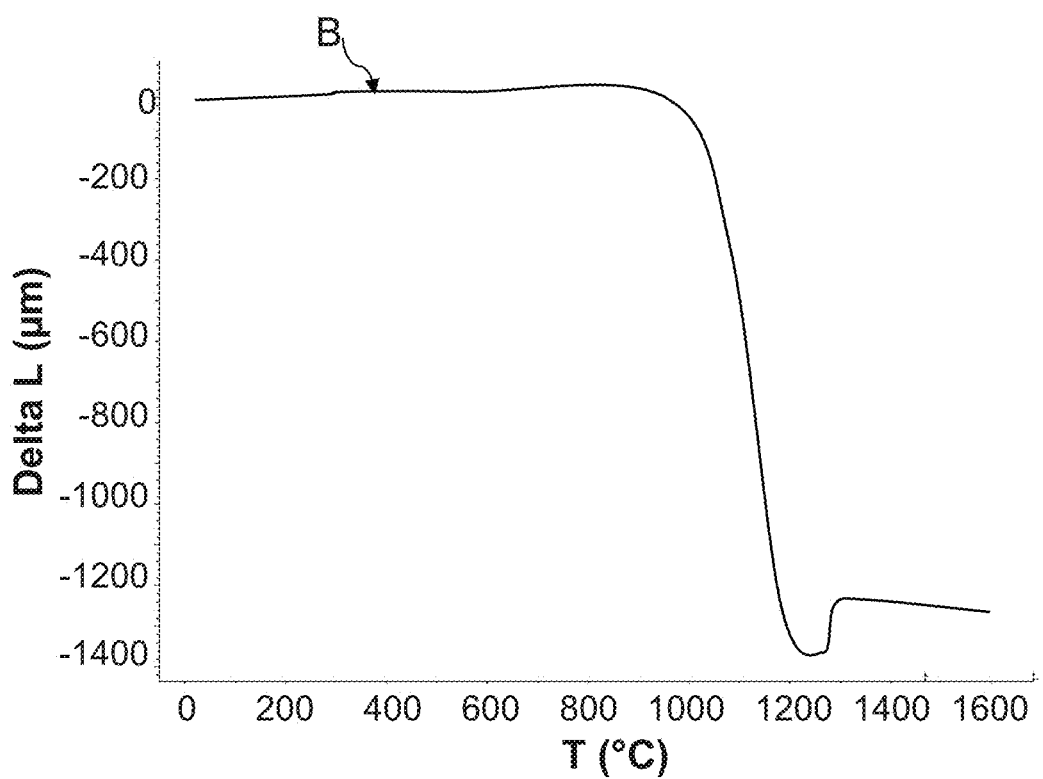
FIG. 2 illustrates the result of a differential thermal analysis in a crystal formation layer containing cesium chloride as the crystallization promoter.

The diagrams of FIGS. 1 and 2 illustrate results of dilatometric measurements. The change in length Delta L (in μm) of the measurement sample is plotted on the ordinate as a function of the temperature T (in ° C.).

Curve A in FIG. 1 illustrates the elongation curve for a green layer produced from a slurry without the addition of a crystallization promoter, and FIG. 2 illustrates the result for a green layer produced from sample 4. Accordingly, the undoped green layer only illustrates a noticeable change in length at a temperature around 1200° C. whereas in the green layer from sample 4 a change in length already begins at a temperature around 950° C. (curve B in FIG. 2).

The change in length indicates the start of sintering of the respective green layer. Accordingly, sintering and densification begin much earlier with the doped green layer than with the undoped layer. The earlier sintering process can be traced back to a contribution by liquid phase sintering. The increase in the dilatometer curve of FIG. 2 at a temperature of about 1200° C. also illustrates the devitrification process already underway. Both effects, with the doped green layer—the earlier densification and the degassing shortly afterwards—contribute to the rapid mechanical stabilization of the layer.

Results of Devitrification Tests and Diffusion Measurements

The diffusion samples were heated in a furnace in air to a temperature of 200° C. and kept at this temperature for one hour. Afterwards, within three hours, the temperature was raised to different measuring temperatures, for example 1300/1500/1600° C., and then kept at these temperatures for six hours. The furnace was then opened and freely cooled.

Figure 8:
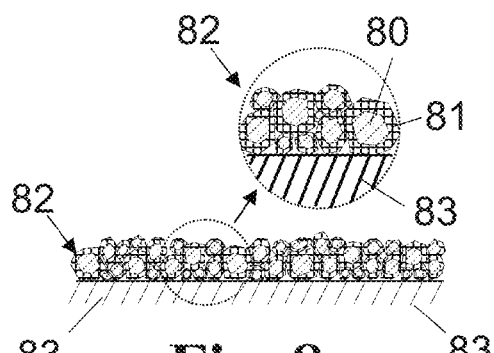
FIG. 8 illustrates a green layer crystallized by action of a crystallization promoter on a glass surface, in a schematic representation.
Figure 9:
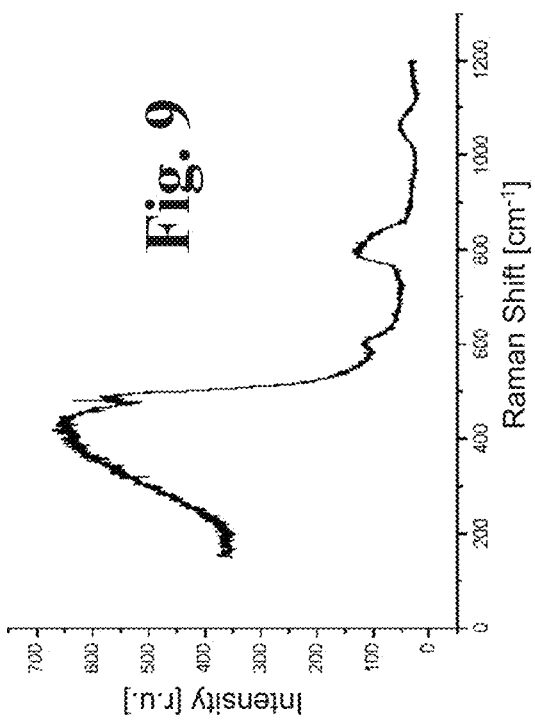
FIG. 9 illustrates the result of a Raman spectroscopic measurement on a cesium-doped green layer heated to 900° C.
Figure 10:
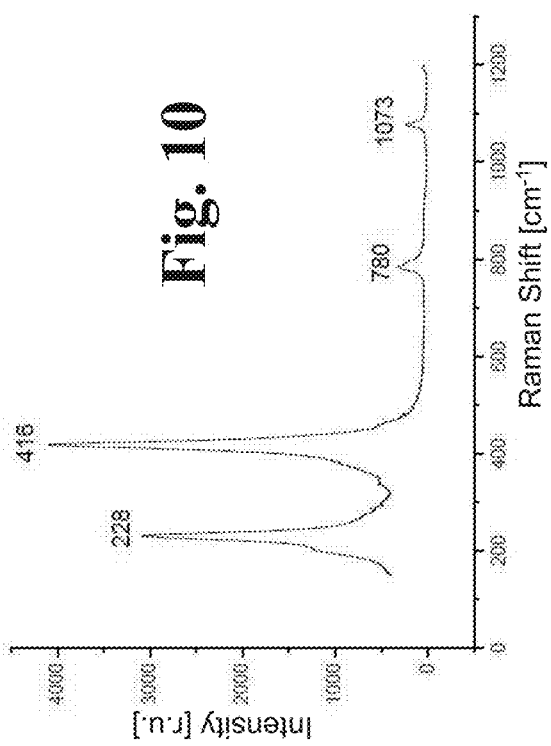
FIG. 10 illustrates the result of a Raman spectroscopic measurement on a cesium-doped green layer heated to 1100° C.
Figure 11:
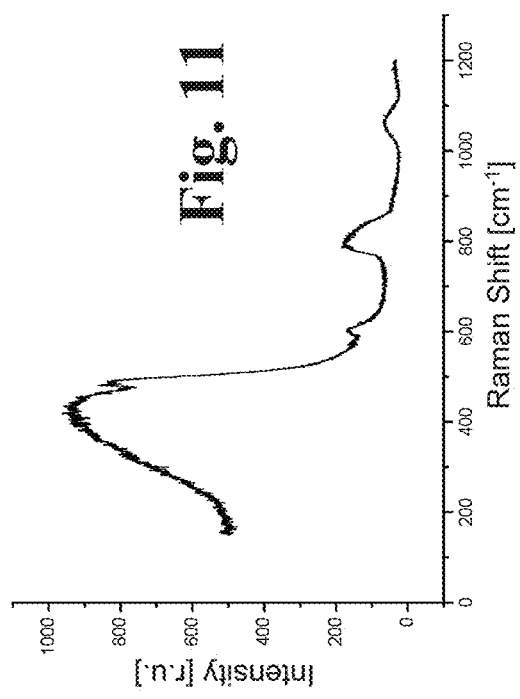
FIG. 11 illustrates the result of a Raman spectroscopic measurement on a rubidium-doped green layer heated to 900° C.
Figure 12:
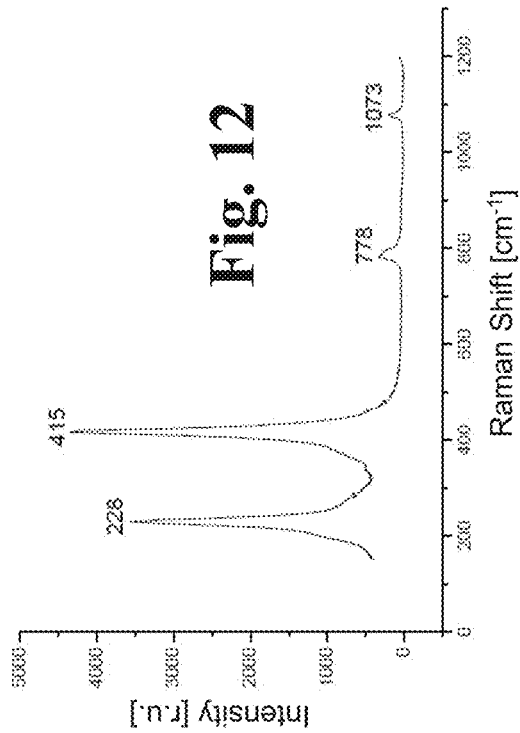
FIG. 12 illustrates the result of a Raman spectroscopic measurement on a rubidium-doped green layer heated to 1100° C.

It is illustrated that the crystal formation layer is already significantly devitrified at temperatures around Tg (1150° C.) and that crystallization does not take place or hardly takes place in the quartz glass substrate (round plate), but exclusively or at least in one embodiment in the porous crystal formation layer, as illustrated schematically in FIG. 8. The former crystal formation layers illustrate porosities of less than 25% throughout.

In a further test, the quartz glass plate was coated with undoped $SiO_2$ slurry, the slurry layer was dried and pre-sintered at 1150° C. 5 ml salt solution (1 mole % CsCl) were applied to a partial area of approx. 100×100 $mm^2$. The salt solution penetrates the still porous slurry layer, dries and thus infiltrates the particle surfaces. After renewed sintering in the furnace at 1200° C., however, delaminations and cracks occur—a macroscopic indication of cristobalite formation in the layer. The desired stabilization is achieved here, but the adhesion of the stabilization layer is not optimal. This can be attributed to the fact that by infiltrating the pre-sintered green layer, a distribution of the crystallization promoter is achieved which is less homogeneous than with green layers produced from slurries which already initially contain the crystallization promoter in dissolved form.

On the measurement samples obtained in this way, the concentration profiles were determined by inductively coupled plasma mass spectroscopy (ICP-MS), as described above. The distance between the measuring points of the profile is about 100 μm.

Figure 4:
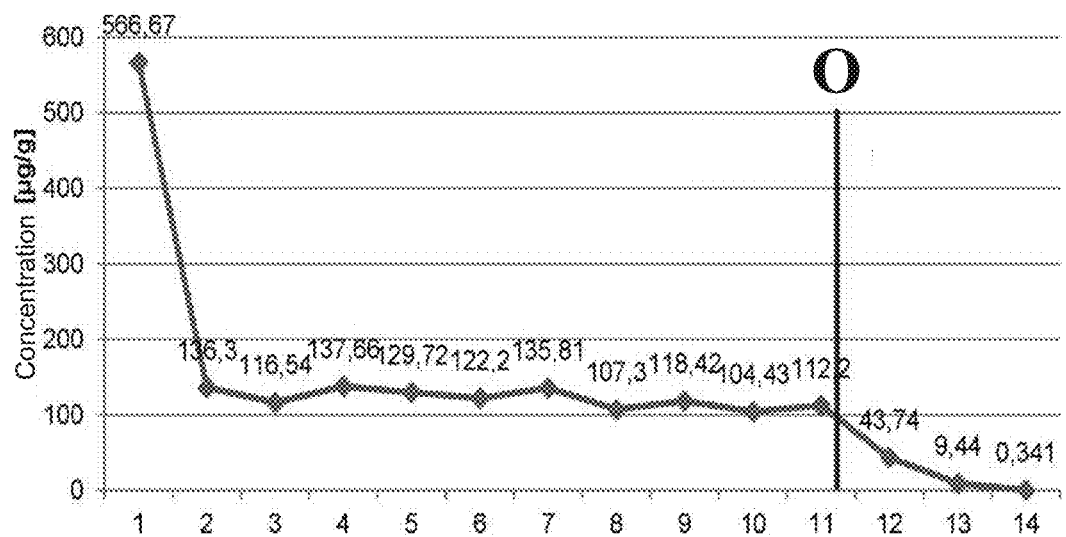
FIG. 4 illustrates the result of a diffusion measurement for the crystallization promoter RbCl at a diffusion temperature of 1300° C.

The diagram in FIG. 4 illustrates the result for the diffusion sample with the composition of sample 1 according to the table after temperature treatment at 1300° C. The concentration K (in μg/g) is plotted against the sequence S of the measuring points. The "0" line marks the interface between the devitrified stabilization layer and the quartz glass substrate. A certain diffusion of rubidium into the substrate in the range of 30 to 60 μm/g is visible. However, the concentration within the substrate decreases noticeably after 5-6 measuring points (that is, after a layer thickness of 500-600 μm).

Figure 5:
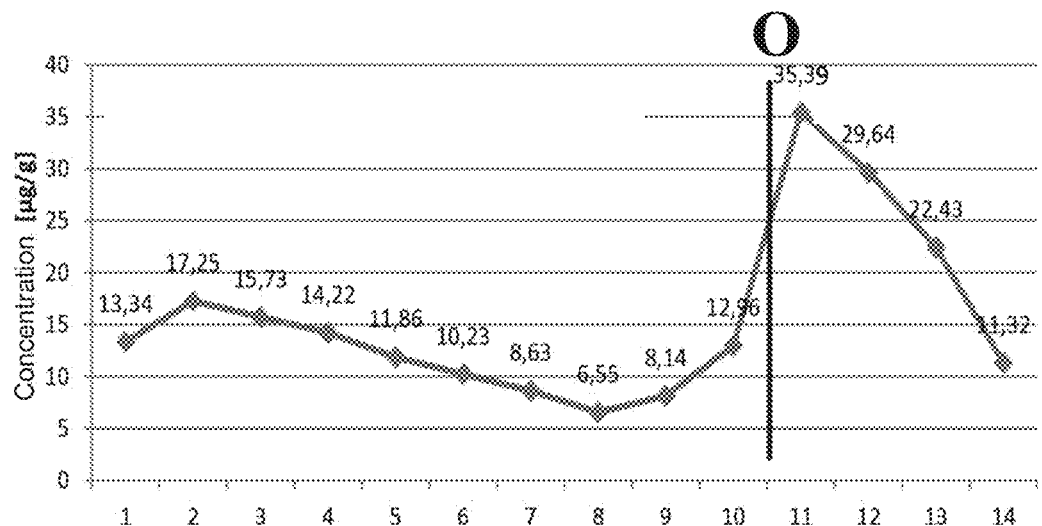
FIG. 5 illustrates the result of a diffusion measurement for the crystallization promoter RbCl at a diffusion temperature of 1500° C.

The diagram in FIG. 5 illustrates the result for the diffusion sample with the composition of sample 1 according to the table after temperature treatment at 1500° C. Here a clear depletion of Rb by evaporation is recognizable. The concentrations in the stabilization layer are only about 10% of the concentrations in the measurement sample of FIG. 4. Only the concentration within the substrate still has approximately the same level as the measurement sample of FIG. 4. It has been found that evaporation of rubidium is also considerable in the measurement sample treated at 1400° C.

Rubidium is removed from the stabilization layer by way of evaporation and can no longer act as a crystallization promoter to its original extent. This prevents enrichment in the substrate, which can lead to crystallization of the substrate. In this way, a long-term stability of the "devitrified stabilization layer/glassy substrate" system is achieved even at high operating temperatures.

Figure 6:
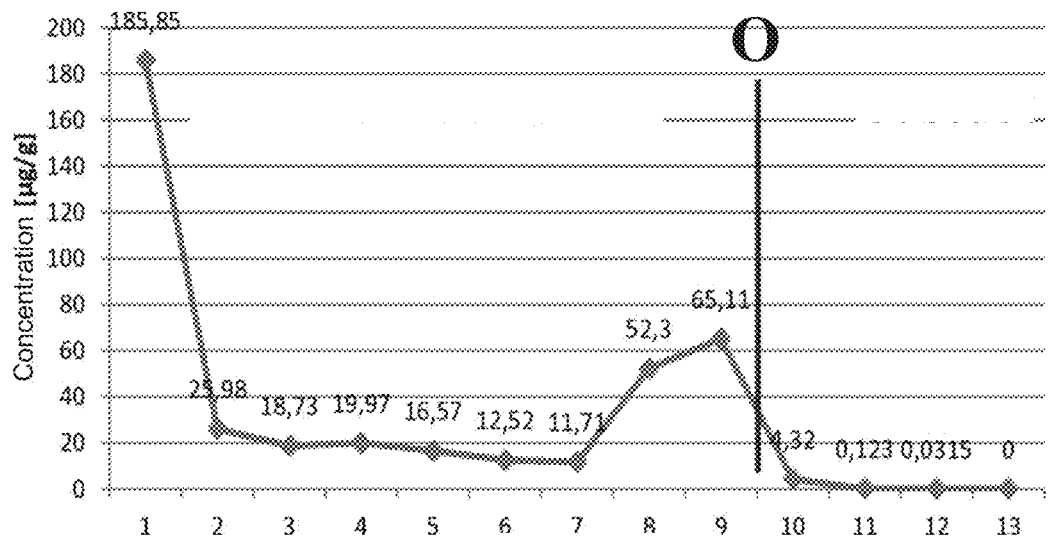
FIG. 6 illustrates the result of a diffusion measurement for the crystallization promoter CsCl at a diffusion temperature of 1500° C.

FIG. 6 illustrates the concentration profile for the diffusion sample with the composition of sample 4 according to the table after temperature treatment at 1500° C. A diffusion of Cs into the substrate hardly takes place even at this high temperature. This also prevents enrichment in the substrate, which could lead to crystallization, so that a long-term stability of the "devitrified stabilization layer/glassy substrate" system is also achieved in this way.

It has been illustrated that doping with Rb and Cs is similarly suited to trigger devitrification as the "usual" alkalis Li, Na and K. However, this will avoid the disadvantages associated with these alkalis, which disadvantages manifest themselves for example, by their progressive enrichment in the quartz glass substrate and the resulting progressive devitrification of the substrate. Because with Cs there is either no or a hardly detectable diffusion from the stabilization layer into the glassy substrate material, and with Rb at an operating temperature of more than 1400° C. there is a noticeable depletion over time.

Results of Crystallization Measurements

Several samples were treated at a temperature in the temperature interval of 900° C. to 1600° C. for 6 h and the crystallization was then analyzed Raman spectroscopically. The most important measurement results are summarized in FIGS. 9 to 12.

The diagrams respectively illustrate the measured Raman intensity against the wave number of the Raman shift (in $cm^{-1}$). The measurement samples correspond to samples 1 and 4 from Table 1 for treatment temperatures of 900° C. and 1100° C., respectively. Accordingly, at the treatment temperature of 900° C. there is no pronounced intensity peak in the measurement spectrum for both sample 1 (FIG. 11) and sample 4 (FIG. 9), which indicates that no crystallization of the measurement samples took place during this treatment.

In contrast, at the treatment temperature of 1100° C., both measurement samples illustrate distinct intensity maxima at wave numbers of 228, 416, 778 and 1073 $cm^{-1}$, all of which can be assigned to cristobalite. This is evidence of the early onset of cristobalite formation in both measurement samples.

Although specific embodiments have been illustrated and described herein, it will be appreciated by those of ordinary skill in the art that a variety of alternate and/or equivalent implementations may be substituted for the specific embodiments illustrated and described without departing from the scope of the present embodiments. This application is intended to cover any adaptations or variations of the specific embodiments discussed herein. Therefore, it is intended that these embodiments be limited only by the claims and the equivalents thereof.

What is claimed is:

1. A method for producing a quartz glass component, with a crystal formation layer containing a crystallization promoter being produced on a coating surface of a base body of quartz glass, comprising:

producing a porous cristobalite crystal formation layer containing amorphous $SiO_2$ particles with a mean thickness in the range of 0.1 to 5 mm;

wherein the crystallization promoter is a substance that contains cesium and/or rubidium; and wherein the amount of the crystallization promoter substance in the porous crystal formation layer is at least 0.025 mole % and not more than 0.5 mole %.

2. The method of claim 1, wherein the crystallization promoter substance has a melting temperature below 1150° C.

3. The method of claim 1, wherein the crystallization promoter substance has a melting temperature below 1100° C.

4. The method of claim 1, wherein the porous cristobalite crystal formation layer is produced with a mean thickness in the range of 0.5 to 3 mm.

5. The method of claim 1, wherein amorphous $SiO_2$ particles produced by comminuting quartz glass make up the greatest volume proportion of the crystal formation layer.

6. The method of claim 1, wherein the production of the porous cristobalite crystal formation layer comprises:

applying a dispersion which contains the amorphous $SiO_2$ particles in a liquid, as a slurry layer to the coating surface; and drying the slurry layer while forming a green layer.

7. The method of claim 6, wherein the crystallization promoter or a precursor substance thereof is contained in the dispersion in dissolved form.

8. The method of claim 6, wherein the green layer has a green density of at least 1.7 $g/cm^3$.

9. The method of claim 6, wherein the green layer is thermally densified at a temperature in the range of 670° C. to 1000° C.

10. The method of claim 1, wherein the porous cristobalite crystal formation layer is heated to a temperature of less than 1250° C. and that the formation of cristobalite sets in during heating of the layer.

11. The method of claim 1, wherein the porous cristobalite crystal formation layer is heated to a temperature of less than 1150° C. and that the formation of cristobalite sets in during heating of the layer.

\* \* \* \* \*